April 26, 1966  G. D. FEHELY  3,247,963
AUTOMATIC GREEN CHAIN
Filed Oct. 23, 1964  2 Sheets-Sheet 1
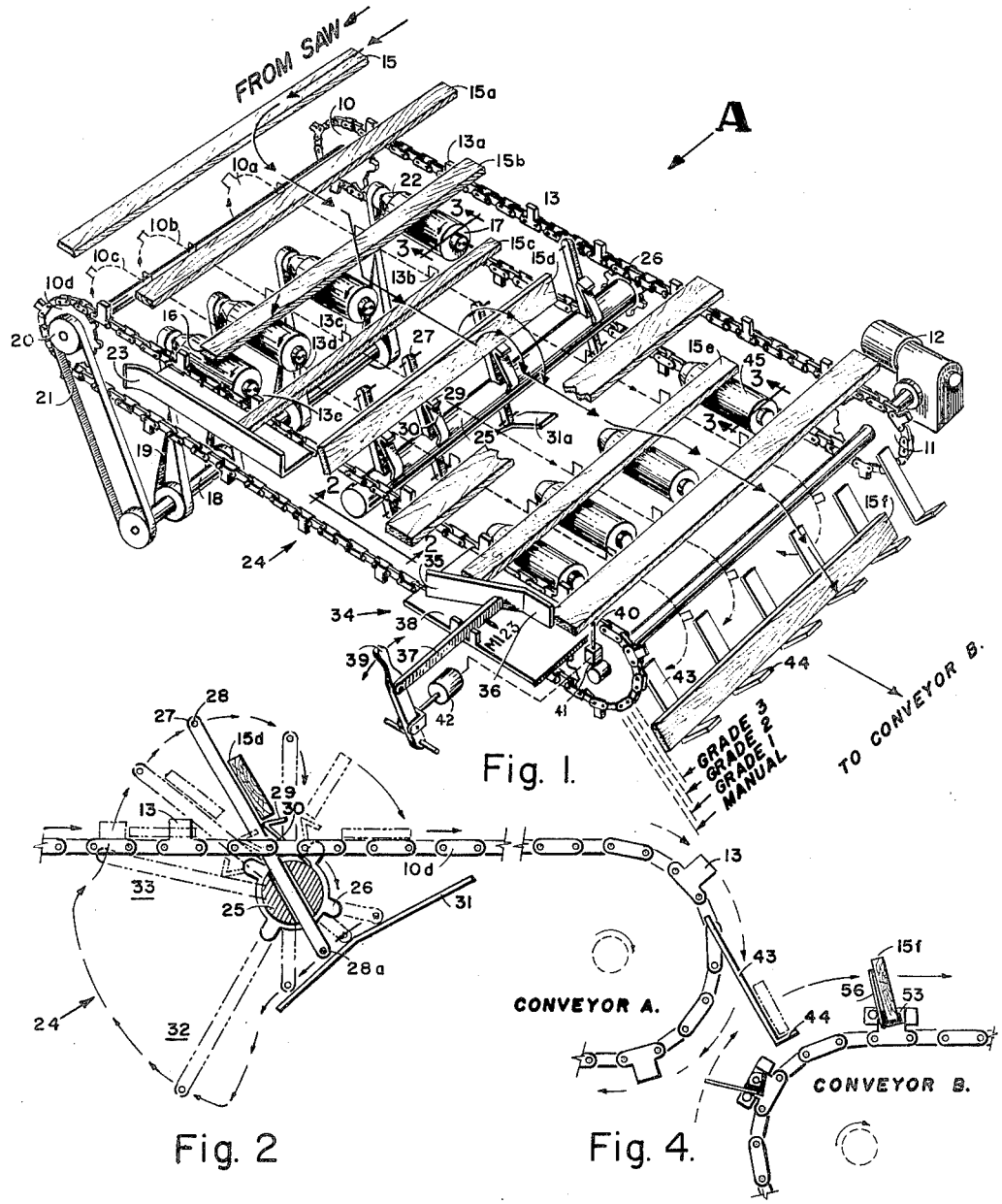
GLENN D. FEHELY
INVENTOR.
BY.
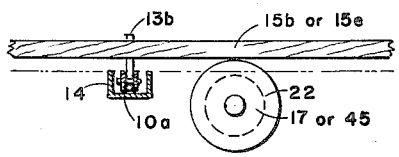

April 26, 1966  G. D. FEHELY  3,247,963
AUTOMATIC GREEN CHAIN

Filed Oct. 23, 1964  2 Sheets-Sheet 2

GLENN D. FEHELY
INVENTOR.

BY
Townsend and Townsend

United States Patent Office
3,247,963
Patented Apr. 26, 1966

3,247,963
AUTOMATIC GREEN CHAIN
Glenn D. Fehely, Arcata, Calif., assignor to Lumbermatic, Inc., Arcata, Calif., a corporation of California
Filed Oct. 23, 1964, Ser. No. 405,952
15 Claims. (Cl. 209—75)

This invention relates to machinery for grading and sorting boards. More particularly, it relates to machinery for automatically handling random assortments of boards and delivering them to a plurality of stations according to grade, length, width, etc., as desired. The only human effort required during this procedure is in connection with inspection of each board at a grading station followed by a decision as to grade based upon the inspection. All other aspects of the procedure are accomplished automatically by the machine.

Present green chain practice involves a great deal of manual labor. As with the present invention, a graderman is positioned along the chain for determining grade and classification of the lumber. Following the grading, however, manual labor is employed to pull graded boards from the chain and assemble them at a station for further handling. By and large the labor is unskilled and undependable. Substantial errors are made in pulling the boards and assembling them so that even though the boards were properly graded in the first instance they wind up at the wrong stations.

The present invention provides apparatus that assures properly graded lumber arriving at the desired location. The operation is fast and efficient. Further, aside from machinery maintenance personnel, it requires only one operator for the whole green chain positioned at the grading station as opposed to the multitude of personnel required for pulling the graded lumber now commonly used in conjunction with the graderman.

The invention can be described over-all as a machine for grading and sorting boards utilizing a conveyor for transporting boards in spaced apart parallel relation thereon. The boards are transported by the conveyor in a direction transverse to the longitudinal axes of the boards. Means are included to align a common transverse edge of each board on the conveyor. As each board reaches a preselected location on the conveyor it encounters means which automatically turns the board on the conveyor without actuation by the graderman. In this way the graderman can inspect all of the major surfaces and properly grade the boards. The machine has a grading assembly operable to sequentially displace each board on the conveyor a preselected distance along the longitudinal axis of the board. Boards of common grade designation are displaced an equal distance relative to the common aligned transverse edge of all of the boards.

The conveyor part of the machinery includes a plurality of unloading carriers mounted on the conveyor. The unloading carriers are designed to each receive an individual board and continue the transport of the boards following grading. Means are provided for disposing boards on the unloading carriers in grade-displaced position. A plurality of unloading stations corresponding to grade designations are positioned along the conveyor. Means at each unloading station responsive to the magnitude of the board displacement operate to cause the unloading carriers to unload when a board having a predetermined amount of displacement is proximate to the station. As a result, each station receives all boards having a common grade designation. As will be discussed more fully, further machinery can be utilized at the unloading stations to transport the boards from the station and automatically package the boards if desired.

In the over-all sequence above, a number of specific assemblies have been developed in order to provide a smooth, trouble free machine. Some of the more important parts to be described in detail include the mechanism for turning the boards automatically in the vicinity of the grading station. Other specific refinements making the machine function well include the specific mechanisms for causing the unloading carrier to unload. These and other aspects will be better appreciated by considering the drawings in detail. Generally, the drawings illustrate the following views of the machinery.

FIG. 1 shows a perspective view of the grading table portion of the conveyor including the mechanism for aligning one edge of the boards, turning the boards, and grading the boards by longitudinal displacement thereof.

FIG. 2 is a side sectional view viewed from the position of line 2—2 of FIG. 1 and illustrating the details of the board turning mechanism.

FIG. 3 is an end sectional view taken along the lines 3—3 of FIG. 1 and illustrating the position of the live rolls relative to the boards and conveyor chains.

FIG. 4 is a side view illustrating the relationship of the grading conveyor and the sorting conveyor at the point where a board is picked up from the grading conveyor onto the sorting conveyor.

Figure 5:
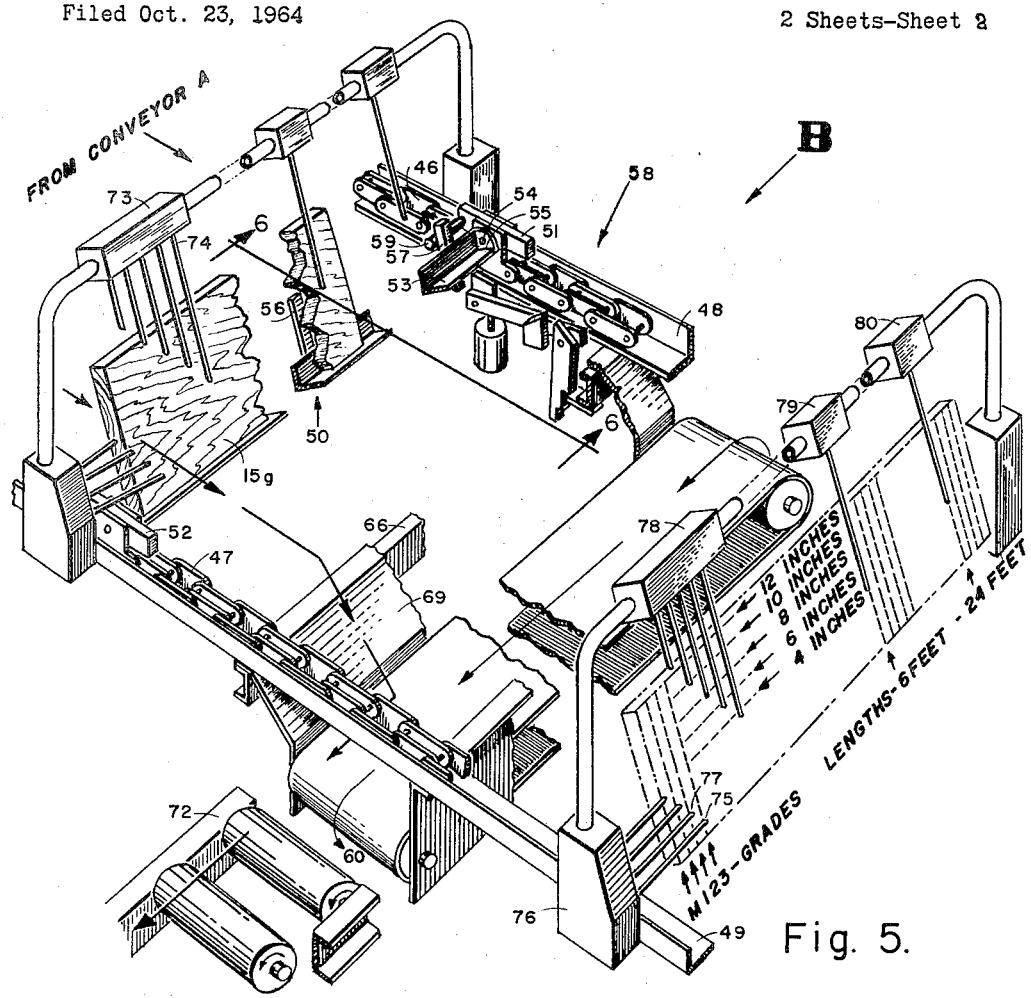
FIG. 5 shows a perspective view of a portion of the sorting conveyor illustrating the unloading conveyors and the mechanism for causing the unloading carriers to discharge a board at a particular unloading station.

Taking the drawings in detail, the conveyor is preferably formed in two parts. The first part is referred to as the grading conveyor and is designated generally A whereas the sorting portion of the conveyor is generally designated B. While it is possible to combine conveyors A and B into one conveyor unit, the two-part construction illustrated in the drawings is preferred. The reason for this is that the grading conveyor A is a relatively short unit of constant length and components for all operations. Conveyor B may be varied from short units with only a few stations to very long units with a great number of unloading stations depending upon the type of operation involved and the number of different board grades, length, etc., to be sorted. By separating the two conveyors, power can be supplied individually to each part (although synchronization is, of course, required) and breakdowns and other problems on conveyor B need not interrupt functioning of conveyor A.

Taking conveyor A, attention is directed to FIG. 1. The conveyor comprises five or more continuous roller chains 10, 10a, 10b, 10c and 10d which are driven in conventional fashion around sprockets such as sprocket 11 from which power is supplied from a suitable source such as motor 12. Five chains are used to accommodate the normal length distributions of boards and provides at least two chains to support the shortest boards encountered.

The roller chains such as 10 include upright lugs such as lug 13 spaced equidistantly therearound. Lugs such as 13 are found on each of the five chains 10–10d and are arranged to lie in common transverse planes relative to the direction of movement of conveyor A, conveyor A being powered to move in the direction of the arrows. Lugs are spaced on each chain according to type of materials being processed. For example, 20″ spacing works well with boards while 10″ spacing may be used for studs.

The five chains 10–10d are disposed in a U-shaped track 14 as illustrated in FIG. 3 relative to chain 10a.

In operation, a plurality of boards such as boards 15 and 15a are supplied from a saw and enter conveyor A. The boards are placed onto the input end of conveyor A by any suitable device including hand labor or suitable conveyors and the like. The boards span two or more of the five chains depending upon their length. Theye are positioned so that their longitudinal axes are transverse of the direction of flow on conveyor A and are individually spaced between adjacent lugs such as 13 and 13a on each chain. As a result, a row of lugs such as 13, 13b, 13c, 13d and 13e lying in a common plane across the chains 10–10d engages a board such as 15c along a narrow longitudinal edge thereof. Movement of the chain thus causes the board to be moved in the direction of the flow arrows.

The boards such as 15b are aligned along a common transverse edge of the boards (corresponding to edge 16 of board 15b) by means of a plurality of tapered live rolls such as roll 17. The rolls are rotated in the direction of the arrows shown on their surfaces through a conventional drive including a shaft 18 and belts such as 19 which in turn derive power from the main drive for conveyor A through sprocket 20 and belt 21.

The boards are lifted expeditiously onto the live rolls by riding up the tapered ends of the rolls such as 22 of roll 17. While on the rolls the boards are lifted above the surfaces of the chains as shown most clearly in FIG. 3. The rolls move the boards in the direction of their longitudinal axes as indicated by the arrow on board 15b. This alignment movement is limited by a straight edge 23 mounted on the side of conveyor A. During further movement of the boards along conveyor A the common alignment of the edges thereby produced is maintained.

The boards then reach the turnover station shown generally at 24. The turnover of the boards is to permit a graderman to inspect substantially all of the board surfaces so as to properly grade the boards. The turnover mechanism is illustrated in detail in FIG. 2. It includes a shaft 25 comprising a hollow tube mounted beneath the board conveying area of conveyor A and powered by sprocket 26 deriving power from the movement of chain 10. Consequently the rotation of tube or shaft 25 is at all time proportional to the speed of movement of conveyor A.

A plurality of arms such as 27 are slideably inserted through diameters of shaft 25. The arms are inserted so as to lie in a common plane. Taking arm 27 as typical of all of the arms, each end contains a protuberance 28 and 28a which limits the movement of arm 27 while sliding through shaft 25. The aperture in shaft 25 is large enough to permit free sliding of arm 27 only until the protuberance 28 or 28a reaches the surface of shaft 25. It is preferred to form the arms with a square or rectangular configuration to prevent rotational movement of the arms in shaft 25.

A foot such as foot 29 which is typical of the others is supported above the surface of shaft 25 adjacent to arm 27 by typical leg 30. Foot 29 and arm 27 project above the carrying surface of the chains 10–10d so as to be capable of lifting the boards above the chain surface during functioning of the turnover unit.

A guide surface comprising an inclined plate such as plate 31 is disposed beneath shaft 25 vertically aligned with arm 27. The protuberances at the end of each arm ride on such a guide surface during operation of the unit. See FIG. 1 for the position of a typical plate 31a.

The turner functions as follows. With the arm extended downwardly as shown at 32 in FIG. 2, continued rotation of shaft 25 brings arm 27 upwardly and under a board to be turned at 33. (The board turner is timed so as to so engage the narrowest board being processed. Pick up of all other widths will thereby be assured.) Further rotation of shaft 25 causes arm 27 to come upwardly above the surface of conveyor A carrying board 15d with it. Board 15d will tend to slide downwardly by gravity as arm 27 is continuously being moved upwardly. The board will come to rest on foot 29 and will be maintained in this position for the next small portion of the cycle by arm 27. As the arm 27 passes the vertical position sliding of the arm 27 through shaft 25 is checked by contact of an end of arm 27 on the guide surface 31. The inclination of guide surface 31 is adjusted so that the sliding through of arm 27 is regulated to maintain a sufficient amount of the arm above conveyor A to support the board being turned and prevent it from falling backwardly onto the conveyor. As the arm 27 passes the vertical position and starts downwardly, the inclined attitude of foot 29 causes the board to start turning and falling forwardly towards conveyor A. As the rotation continues the board falls in a turned position onto the conveyor and is picked up by a row of lugs such as 13–13e that have been carrying it along for continued forward movement. At this point, arm 27 is permitted to fall all the way through to its starting position at 32. This fall through of the arm is required so that the arm is not in a position to strike the surface of the just turned board which has not as yet been moved sufficiently far ahead to be out of range of a "scissor" type action. All other arms go through this cycle together.

A modification of the board turner to provide a foot and leg on the opposite side of the shaft 25 relative to the existing foot 29 shown will permit the turning of two boards for every turn of shaft 25. Lug spacing and rotational timing changes of an appropriate nature will, of course, be necessary in the event that this modification is incorporated.

It may also be desired to install stops above the surface of the chains 10–10d to catch the falling board coming off the turner where the boards are heavy and direct contact with the conveyor chains is to be avoided. Also, the stops could be fitted with spring loaded cushions so as to ease the impact of the board when reaching the surface.

The turned board will have been carefully inspected by the graderman during the preceding turning operation. Based upon this inspection a grading of the board can be made. For illustrative purposes four positions or grades are indicated as M, 1, 2 and 3. The turned board 15e enters the grading area shown generally at 34 with the aligned edge 35 coming in contact with a grading straight edge 36. Grading straight edge 36 is attached to an arm 37 and mounted for slideable movement on plate 38. Arm 37 is moved by pushing lever 39 as shown by the arrows.

FIG. 1 illustrates the position of straight edge 36 necessary to cause board 15e to be displaced in the direction of its longitudinal axis so as to be subsequently removed from the machine along with all other boards of similar grade here denoted grade 2. As each board is thus displaced it is preferred to allow the board to contact the probe 40 of a micro-switch 41 which by means of a suitable circuit will actuate a solenoid 42 which in turn forces grading lever 39 to return to its starting position marked M. (In practice boards graded M—for manual green chain—constitute small quantities and are specially handled as they come off the sorter to be described.) In this way the graderman will be starting from the same position when grading each board. The same number of steps forward will always assign a given grade. The automatic return of the lever to a starting position thus simplifies the mental steps necessary in deciding how many steps forward to move the lever to assign a given grade.

Following grading, the boards are conveyed to a plurality of fingers such as finger 43 which catch the board in its displaced position and hold it ready for pickup by conveyor B. The boards simply slide off the end of chains 10–10d, down the fingers, and are stopped by the upturned ends such as end 44 of the fingers. The fingers are sufficiently long so that the board is maintained below the turning perimeter of the chains 10–10d when the widest board is positioned on the fingers as shown in FIG. 1.

A plurality of tapered rollers such as roller 45 are installed in line with the grading station. The boards are conveyed up and onto these rollers in the same manner discussed in relation with the live alignment rollers such as roller 17. In this way the boards are raised above the chains 10–10d and the longitudinal displacing movement is more easily manually accomplished on the roller surfaces without frictional engagement with the chains. The rollers in line with the grading station such as roller 45 are not powered.

Conveyor B performs the sorting function with the lumber graded on conveyor A. In the preferred embodiment the apparatus takes the form of a pair of parallel roller chain conveyors 46 and 47, powered to slide in channels 48 and 49 respectively in much the same manner as the chains of conveyor A. However, in this case only two chains are employed which define the longitudinal perimeters of conveyor B. The distance between the two chains 46 and 47 is greater than the width of conveyor A so that the longest board processed on conveyor A will fit between the two chains on conveyor B.

Conveyor B includes a procession of unloading board carriers such as unloading or dump carrier shown generally at 50 which are designed to pick up the boards as they come to rest on fingers 43 of conveyor A. Each board carrier 50 is a dumping type unit and is formed from two blocks 51 and 52 attached to either end to conveyor chains 46 and 47 respectively. A cross member 53 having a right angle V configuration spans the distance between the two chains. The cross member 53 is mounted for pivotal movement in the two blocks 51 and 52 by tapered rods such as 54 extending from end members such as 55 of cross member 53 and inserted through a hole in the blocks 51 and 52. A plurality of projections such as 56 are disposed along the length of and upwardly from cross member 53. The projections 56 are of a length required to reach up more than half way of the width of the widest board being handled.

The unloading carrier unit is normally positioned so that the V of the cross member 53 is in a backwardly reclining position and is yieldably urged in that direction by a spring wire (not shown) wound around the tapered rods 54 of the cross member in the portion inserted into the blocks 51 and 52.

A depending arm 57 is mounted along one side of cross member 53 for engagement with the mechanism for causing the unit to unload shown generally at 58 and as will be described hereinafter. The arm 57 also extends above the top of the cross member 53 and contacts a projecting rod 59 mounted on block 51. Contact of the upwardly extended portion between arm 57 and rod 59 prevents the spring from urging the carrier unit backwardly beyond the position shown in FIG. 5.

Pickup of boards on conveyor B from conveyor A is accomplished during normal movement of conveyor B during driving of the chains in conventional fashion. Chains 46 and 47 of conveyor B form endless loops. On their return they are moved so as to come up and adjacent to fingers 43 of conveyor A. The two conveyors are offset so that projections 56 on the unloading carriers 50 come up and between fingers 43 which are holding a graded board 15f on conveyor A. Board 15f is lifted from fingers 43 onto projections 56 as each carrier 50 comes around for the commencement of the conveying portion of their cycle over conveyor B as shown in FIG. 5. The positions of the fingers 43 of conveyor A and the projections 56 of carriers 50 of conveyor B at the moment of pickup is illustrated in FIG. 4. It is to be noted that the boards are carried in an "on edge" position on carriers 50 with the boards resting on their narrow longitudinal edge and standing generally uprightly on the carriers and tilted slightly backwardly.

Unloading of the carrier 50 occurs when its depending arm 57 engages the trip or catch assembly 58 that has been moved into tripping position. This causes rotation of the carrier 50 forwardly about rods 54 discharging the boards between the two chains 46 and 47 onto a suitable carrier such as conveyor 60.

Figures 6A, 6B:
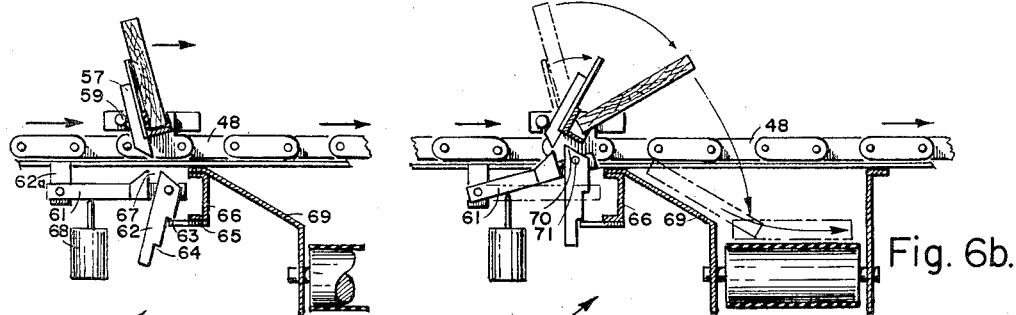
FIGS. 6a and 6b are detailed side sectional views illustrating the mechanism for causing the unloading carriers to unload.

The tripping and pivotal operation is accomplished as follows. A catch 58 is mounted at each unloading station comprising a pivotally mounted arm 61 depended from channel 48 by member 62a. At the extended end of arm 61 a second arm 62 is pinned to arm 61. Arm 62 is stepped at 63 and 64 so as to be engageable and supportable on a shelf 65 suspended by a bracket 66 from channel 48. Arms 61 and 62 are sloped back from their adjacent ends and define a notch or channel 67 therebetween. Solenoid 68 is positioned beneath arm 61 to move the entire assembly upwardly as shown in FIG. 6b at preselected times as will be described. FIG. 6b illustrates the position of the catch 58 which will cause rotation and dumping of the carrier units 50, catch 58 having been placed there by the upward urging of solenoid 68. The lower step 64 of arm 62 rests on shelf 65 and holds it in this position. The depending portion of arm 57 on board carrier 50 is angled so that the lower end will ride up the slope of arm 61 and lodge within the channel 67 formed by arms 61 and 62. This momentarily stops the forward movement of the carrier unit 50. Forces build up and override the return spring on rod 54 (which keeps the unit in its normal upright position) and causes a pivotal forward movement sufficient to throw the board forward out of carrier unit 50, down slide 69, and onto conveyor 60 (see FIG. 6b).

Continued movement forward of the carrier unit 50 creates new forces in channel 67 from depending arm 57. These forces are directed against the upper lip 70 of arm 62 causing it to rotate about its pin 71 and thereby dislodge lower step 64 from shelf 65. At this point the catch unit 58 drops back to the position shown in FIG. 6a with the upper step 63 of arm 62 resting on shelf 65. The catch is thus moved out of position for unloading of carrier units until solenoid 68 moves it back to the position shown in FIG. 6b.

Conveyor belt 60 and associated roll case 72 are shown as one way of transporting away the unloaded boards. Roll case 72 may conveniently be linked to an automatic packaging unit such as the one described in copending patent application 425,390, filed January 14, 1965. Manual handling of the boards is of course another alternative as well as the use of other types of board handling machinery. As another alternative it is possible to dispose packaging units of the type described in said copending application between chains 46 and 47 of conveyor B so that the boards fall directly from slide 69 onto the loading forks of the packaging unit.

Actuation of solenoid 68 to move the tripping catch 58 into tripping position is suitably accomplished by a relay circuit energized through micro-switches such as switch 73 whose probes 74 engage boards as they are moved by on the unloading carriers.

A suitable arrangement is keyed to the grading position accomplished with the lateral displacement of the boards at the grading station shown in FIG. 1. For example, assuming that the grading station is moved into a position indicated by the pointer in FIG. 1, as a grade 2 board is brought into contact with straight edge 36 it is displaced laterally into the position denoted by the broken line of grade 2. The board will end up in this displaced position on the unloading or dumping carrier 50. Probes 75 from micro-switch 76 are set to extend outwardly from the switch distances corresponding to the various grades. Thus a board having been displaced in the manner shown in FIG. 1 will strike probe 77 corresponding to grade 2. Probe 77 may be linked to energize solenoid 68 and cause dumping of the board at this station.

Further refinements in the grading and sorting can be made. Thus, it is contemplated that other microswitches such as 78, 79 and 80 can be disclosed over the conveyor B to sense width of the board as well as length of the board. For example, at the same station referred to above in FIG. 5, suitable circuitry (which will be clear to those skilled in the art) can be established so that a board engaging the probe 77 for grade 2 alone will not energize solenoid 68 unless preselected width and height probes of switch 78–80 are also engaged. For example, it might be established that grade 2 boards having 8" width and 24' length only will cause solenoid 68 to be actuated. It is to be noted that the upright stance of the boards on the dump carriers 50 permits this sensing of board width.

In general, conveyor B can be any desired length depending upon the number of unloading stations desired. The stations can be arranged in any order. However, within a given grade and utilizing micro-switches and probes as illustrated, it should be clear that the longer and wider boards must be discharged first so that they will not interfere with subsequent switches designed to sense the shorter and narrower boards. In general, the longer and heavier boards should be unloaded at the beginning of conveyor B so as to minimize power requirements for the unit.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A machine for grading and sorting boards comprising, in combination: conveyor means for transporting a plurality of spaced apart parallel boards in a direction transverse to the longitudinal axes of the boards; means for aligning a common transverse edge of each board on the conveyor means; means for automatically turning the boards as each reaches a preselected location on said conveyor means; a grading assembly operable to sequentially displace each board on the conveyor a preselected distance along its longitudinal axis, boards of common grade designation being displaced equal distances; unloading carriers mounted on said conveyor means for receiving individual boards; means for disposing said boards on the unloading carriers in displaced position; a plurality of unloading stations corresponding to grade designations along said conveyor means; and means at each unloading station responsive to the magnitude of said board displacement operable to cause said unloading carriers to unload when a board having a predetermined amount of displacement is proximate to the station.

2. A machine in accordance with claim 1 wherein said conveyor means includes a plurality of parallel roller chains with lugs mounted on each and spaced to define transverse rows across the chains.

3. A machine in accordance with claim 1 wherein said means for aligning a common transverse edge of each board comprises end tapered live rollers positioned for engaging the under side of each board on said conveyor means to move the board longitudinally towards one side of the conveyor means, and a straight edge mounted along said side of the conveyor means for limiting the movement of the boards by said live rollers.

4. A machine in accordance with claim 1 wherein said grading assembly includes a slidable straight edge mounted on said conveyor means in position to contact the aligned edges of said boards, and means connected to said straight edge for sliding it from a starting position against a board to displace the board said preselected distance.

5. A grading assembly in accordance with claim 4 and further including means responsive to the rate of movement of boards by said straight edge operable to return the straight edge to said starting position after each board is displaced.

6. A machine in accordance with claim 1 wherein said discharge carriers comprise pivotally mounted dump troughs adapted to support a board standing upright on one of the board's longitudinal edges.

7. In a board turner for use in grading lumber being transported on a conveyor, a rotatable shaft mounted under the conveyor transversely thereof, at least one arm slidably inserted through the diameter of said shaft and extending outwardly from the shaft a distance sufficient to extend above the plane of the conveyor containing boards being transported, stops on each end of said arm to prevent the arm from sliding completely out of the shaft when the shaft is rotated, a foot mounted on the shaft by a leg adjacent said sliding arm in position to receive and temporarily support over the conveyor a longitudinal edge of a board lifted thereon by said arm when the shaft is rotated, the supporting surface of said foot being sloped to cause turning and falling towards the conveyor of a board supported thereon during shaft rotation, and a guide surface mounted below said shaft and vertically aligned with said arm, said guide surface having a preselected inclination and being positioned to engage sequentially the ends of said arm as the arm slides through the shaft during rotation of the shaft to limit the rate of sliding movement.

8. A board turner in accordance with claim 7 and including a plurality of arms disposed through diameters of said shaft lying in a common plane, and including guide surfaces for engagement with all of said arms.

9. A board turner in accordance with claim 7 and including means for rotating said shaft in coordination with the speed of said conveyor so that said arm is moved into lifting position behind each board being conveyed to lift the board upwardly from the conveyor and onto said foot during further shaft rotation, the so lifted board being retained on the foot and prevented from falling backwardly onto the conveyor by said arm.

10. A machine for grading and sorting boards, comprising, in combination: a first conveyor for transporting a plurality of spaced apart parallel boards in a direction transverse to the longitudinal axes of the boards; means for aligning a common transverse edge of each board on the first conveyor, means for automatically turning the boards as each board reaches a preselected location on the first conveyor, a grading assembly operable to sequentially displace each board on the conveyor a preselected distance along its longitudinal axis, boards of common grade designation being displaced equal distances, a plurality of spaced apart fingers mounted at the end of said first conveyor for sequentially receiving and supporting the graded boards in their displaced location, a second conveyor adjacent said first conveyor adapted for movement at a cooperating speed with said first conveyor, said second conveyor including board holding dump carriers, each dump carrier extending transversely across said second conveyor and being pivotally mounted at its ends to said second conveyor, each dump carrier having a generally right angle V-shaped cross section and including spaced projections extending outwardly from one side of the V, the projections arranged on the dump carrier to fit between the fingers holding the graded and displaced boards on said first conveyor, the dump carriers being moved so as to engage and lift each board with its projections from said first carrier fingers and onto the dump carriers of said second conveyor, means for causing said dump carriers to unload by pivoting at preselected locations along said second conveyor, and means for removing the boards thereby unloaded from said second conveyor.

11. A machine in accordance with claim 10 wherein each dump trough includes an arm depending from one transverse end thereof, at least one catch adapted for engagement with said depending arm mounted along the side of said second conveyor, said catch being movable to a first position for engagement with said depending arms and to a second position out of engagement with said arms, means for moving said catch between said first and second positions, and means mounted on said second conveyor responsive to a preselected displaced position of a board transported in a dump carrier operable to move said catch to said first position, engagement of the depending arm by said catch causing said dump carrier to pivot and thereby unload.

12. A machine in accordance with claim 11 and including means for automatically returning said catch to said second position following movement to said first position and engagement with said depending arm.

13. A machine in accordance with claim 11 wherein said means responsive to the board displacement comprises a micro-switch mounted over said second conveyor including a probe extending into the vicinity of movement of the board on the conveyor.

14. A machine in accordance with claim 11 and including a plurality of micro-switches including associated probes in the vicinity of movement of a board to sense displaced position of the board, height of the upper longitudinal edge of the board in the dump carriers, and overall length of the board in the carriers, said catch being movable to its first position only under preselected conditions of displacement, height, and length of the boards.

15. A machine in accordance with claim 10 wherein the second conveyor of said machine comprises two parallel continuous chains defining the transverse edges thereof, said dump carriers being mounted thereon to span the area therebetween whereby unloading of the dump carriers occurs between the two chains, the two chains of the second conveyor being more widely spaced than the board carrying surface of the first conveyor.

References Cited by the Examiner

UNITED STATES PATENTS 2,501,224 3/1950 Kadell.
2,695,098 11/1954 Rendel.
3,085,686 4/1963 Hanbury.

FOREIGN PATENTS 670,279 9/1963 Canada.

M. HENSON WOOD, Jr., *Primary Examiner.*